US007171922B2

(12) United States Patent
Lipscomb et al.

(10) Patent No.: US 7,171,922 B2
(45) Date of Patent: Feb. 6, 2007

(54) CAT SCRATCHING POST

(75) Inventors: John M. Lipscomb, Cedarburg, WI (US); Stan L. Suring, Cedarburg, WI (US)

(73) Assignee: G.H.L. International, Inc., Cedarburg, WI (US)

( * ) Notice: Subject to any disclaimer, the term of this patent is extended or adjusted under 35 U.S.C. 154(b) by 216 days.

(21) Appl. No.: 10/856,041

(22) Filed: May 30, 2004

(65) Prior Publication Data

US 2005/0011469 A1    Jan. 20, 2005

Related U.S. Application Data

(60) Provisional application No. 60/474,708, filed on May 30, 2003.

(51) Int. Cl.
*A01K 15/02* (2006.01)
(52) U.S. Cl. ..................................................... 119/706
(58) Field of Classification Search ............... 119/702, 119/705, 707, 706; D30/160; 52/737.2, 52/731.5
See application file for complete search history.

(56) References Cited

U.S. PATENT DOCUMENTS

| 2,005,817 | A | * | 6/1935 | Yoder ........................ 119/706 |
| 2,894,487 | A | | 7/1959 | Goldson |
| 2,997,019 | A | | 8/1961 | Bryson |
| 3,581,707 | A | | 6/1971 | Cook |
| D235,270 | S | | 6/1975 | Borak |
| 3,993,027 | A | | 11/1976 | Mullin |
| 4,177,763 | A | | 12/1979 | Cook |
| D254,815 | S | * | 4/1980 | Kossar ....................... 119/706 |
| 4,253,423 | A | | 3/1981 | Kaplan |
| D269,821 | S | * | 7/1983 | Hurley ...................... D30/160 |
| 4,577,590 | A | | 3/1986 | Skroch |
| 4,611,556 | A | | 9/1986 | Frank |
| D295,088 | S | * | 4/1988 | O'Rourke .................. D30/160 |
| 4,790,265 | A | * | 12/1988 | Manson ..................... 119/706 |
| 5,038,716 | A | | 8/1991 | Olson |
| 5,054,429 | A | | 10/1991 | Bradford |
| 5,113,795 | A | | 5/1992 | Delzio |

(Continued)

FOREIGN PATENT DOCUMENTS

DE    198 13 643    3/1999

(Continued)

*Primary Examiner*—Teri Pham Luu
*Assistant Examiner*—Elizabeth Shaw
(74) *Attorney, Agent, or Firm*—Boyle Frederickson Newholm Stein & Gratz, S.C.

(57) ABSTRACT

A cat scratching post that includes a plurality of supports between which an outer covering is disposed. The supports are coupled with at least one joint that can comprise a spline that can be ribbed and that can form part of an end cap. In another preferred embodiment, the supports engage each other and form a post assembly that can be hollow. One preferred joint comprises a tongue and groove coupling. One preferred coupling includes a snap received in a receiver. One preferred post assembly is formed of a pair of supports of substantially identical construction. Each support preferably comprises a spar formed from a common extrusion producing spars of substantially identical cross-section. In assembly, one of the spars is reversed relative to the other so they mirror one another before being engaged to one another using a plurality of spaced apart joints integrally formed of the spars.

44 Claims, 6 Drawing Sheets

U.S. PATENT DOCUMENTS

| | | |
|---|---|---|
| D355,057 S | 1/1995 | Northrop et al. |
| 5,595,141 A * | 1/1997 | Udelle et al. ............... 119/706 |
| 5,630,378 A | 5/1997 | Multala |
| D386,839 S | 11/1997 | Jennus |
| 5,713,306 A | 2/1998 | Johnson |
| 5,775,263 A | 7/1998 | Richards |
| 6,343,569 B1 | 2/2002 | Buendiger |
| 6,345,593 B1 * | 2/2002 | Stewart et al. ............... 119/706 |
| 6,619,237 B2 | 9/2003 | Robertson |
| 6,715,447 B2 | 4/2004 | Haber |
| 2001/0045191 A1 | 11/2001 | Gear |
| 2002/0189549 A1 | 12/2002 | Writer et al. |
| 2002/0195064 A1 | 12/2002 | Robertson |
| 2003/0000483 A1 | 1/2003 | Haber |
| 2004/0194731 A1 | 10/2004 | Linberry |
| 2005/0039695 A1 | 2/2005 | Deming, Jr. |

FOREIGN PATENT DOCUMENTS

| | | |
|---|---|---|
| DE | 20001069 U1 | 8/2000 |
| GB | 968012 | 8/1964 |
| GB | 2239159 | 6/1991 |

* cited by examiner

CAT SCRATCHING POST

CROSS REFERENCE TO RELATED APPLICATION

This application claims priority under 35 U.S.C. Section 119(e) to U.S. Provisional Application Ser. No. 60/474,708, filed May 30, 2003, the entirety of which is hereby expressly incorporated herein by reference.

FIELD OF THE INVENTION

The present invention is directed to a cat scratching post and a method of making a cat scratching post.

BACKGROUND OF THE INVENTION

Many cats have a habit of standing on their hind legs and using their front paws to scratch any convenient object. This practice appears to help a cat to keep its claws in good condition and also enables the cat to exercise by stretching its body and leg muscles. However, this habit can be very annoying when the animal chooses to scratch against an item of furniture or a decorated part of the house.

Products are commercially available that are intended to permit a cat to indulge in its scratching habit without damaging furniture or the like. One such device, namely is a "scratching post," is intended to provide a suitable surface for a cat to scratch.

One type of previous cat scratching post includes a horizontal or angled scratching surface disposed on a frame. Most of the horizontal or angled scratching surface type cat scratching posts include strips of corrugated cardboard that are placed vertically within the frame such that one side of each strip is exposed on an upper surface of the cat scratching post to collectively define the scratching surface. Not surprisingly, the cardboard strips must be replaced periodically after the cat(s) shred the cardboard strips. The replacement requires effort and incurs cost on the part of the cat owner. Furthermore, this type of cat scratching post is very mobile, permitting a cat to move the cat scratching post. Sometimes this results in the cat scratching post being moved to an inaccessible location, such as under a couch. In addition, some cats are unwilling to use this type of cat scratching post, making the initial purchase a complete waste.

Another type of cat scratching post includes a vertical scratching surface formed on a mast that, in turn, is attached to a base. Some cats prefer such an arrangement, possibly because is simulates a tree. This type of cat scratching post usually has a rectangular or cylindrical mast extending vertically from the floor by at least the height that a can reach when fully extending and standing on its hind legs, hence presenting the cat with scratching surface(s) extending 360° around the perimeter of the mast and extending as high as the cat can reach.

Many vertical scratching surfaces are covered in a fabric or a rope to provide a surface on which a cat can scratch. Where fabric is used, it is typically wetted and then stretched around the post to form a vertical overlapped seam. The fabric is held in place by a strip of wood placed over the seam. The strip is normally tacked or stapled over the seam in the fabric to secure the fabric in place. However, the tacks or staples present a danger to cats scratching the post, as cats can damage their claws on the tacks or staples. In addition, the cat may be able to pull the strip from the fabric, whereupon the seam is exposed, and the cat can unwrap the fabric from the post.

SUMMARY OF THE INVENTION

The present invention provides a cat scratching post constructed and arranged so as to hold an outer covering of a cat scratching material without any cat scratching material fasteners being exposed to a cat scratching the outer covering. The post includes an upstanding post assembly or mast that comprises a frame made of a pair of vertical supports that carry the outer covering.

An end cap is disposed at one end of the mast and a pedestal upon which the cat scratching post rests uprightly is disposed at the other end. In one preferred embodiment, there is a second cap disposed between the pedestal and the adjacent mast end. Fasteners, such as screws or the like, preferably are used to attach each cap and pedestal. Where fasteners are used, they preferably each engage an end of at least one of the supports.

Each support preferably is of substantially identical construction. In one preferred embodiment, each support comprises an elongate spar that has a longitudinally extending groove formed in an interior surface. Each groove accepts a tongue of a brace used to interconnect the spars to form the mast. When the tongue of each brace is received in the groove of each spar, a portion of the outer covering is retained between the interior surfaces of the spars, which oppose one another.

In one preferred brace embodiment, the brace is an elongate spline of generally rectangular cross-section that has a tongue formed by a part of the spline disposed along each outside edge. Each tongue is received in a groove in one of the spars with there being a tight friction fit therebetween that helps keep them together.

In another preferred brace embodiment, the brace is an elongate spine that has a pair of spaced apart and outwardly projecting transverse ribs with one of the ribs received in a complementary recess formed in the groove in one spar and the other one of the ribs received in a complementary recess formed in the groove in the other spar. Preferably, two pairs of oppositely extending ribs are employed with each rib received in a complementary recess formed in the groove in one of the spars. When assembled, the ribs provide an interference fit between the spline and each spar, preventing them from coming apart once they are assembled.

In another preferred embodiment, no brace or spline is used. Each support comprises a spar that forms at least one joint with another spar when the spars are assembled to form a mast. When assembled together, a portion of the outer covering is also retained between the opposed interior spar surfaces.

In one preferred embodiment, a plurality of spaced apart joints is used to keep the spars assembled together. At least one joint is disposed adjacent one side of the mast and at least one other joint is disposed adjacent the other side of the mast.

In one preferred embodiment, each joint comprises a tongue and groove coupling. The tongue extends from one of the spars and is received in a groove in the other one of the spars. In one preferred embodiment, the tongue comprises a snap and the groove comprises a snap receiver that preferably is a receptacle, such that a snap fit is provided therebetween. Where a snap is used, it preferably has a rounded and enlarged head that preferably is received in a complementarily configured retaining chamber of the receiver. A necked down entranceway channel that leads to the chamber opposes withdrawal of the snap once it has been received in the chamber.

In another preferred embodiment, a plurality of tongue and groove couplings is employed at each joint. In one preferred dual coupling arrangement, a first tongue on one spar is received in a first groove on the other spar and a second tongue on the other spar is located adjacent the first groove and received in a second groove on the one spar that is located adjacent the first groove. Such a dual coupling arrangement more securely keeps the spars assembled during use and operation.

If desired, the outer covering can be formed of a single piece of flexible material. In one preferred embodiment, a plurality of sections or pieces is used. Each piece of material includes a pair of side flaps that each comprises part of the piece that is disposed along one of its side edges. Each flap can be clamped between a pair of the spars to hold it in place in a manner that can permit it to be removed and replaced. Preferably, each flap is overlapped with another flap, such as of its own piece or another piece, and disposed between the spars. One preferred cat scratching material is a fabric that preferably is a woven fabric, such as carpeting or the like.

In one preferred spar embodiment, each spar has a generally U-shaped cross-section and is of one-piece, unitary and homogenous construction. Each spar includes a pair of sidewalls and a pair of inturned flanges that each forms an arm used to retain a portion of the outer covering against a corresponding opposed arm of another spar when assembled to the other spar. Each pair of opposed arms preferably includes a joint that retains them in engagement with each other when the spars are assembled to each other. In one preferred embodiment, each joint employs a plurality of couplings.

In another preferred embodiment, each end cap has a receptacle in which each end of each spar is received. The receptacle preferably comprises a channel defined by an upraised end cap lip and an interiorly disposed spline that has a plurality of tongues, each of which is received in a corresponding groove formed in each spar. Fasteners are preferably used to attach each end cap to a corresponding end of each one of the spars. If desired, such an end cap can be incorporated into the pedestal such that it can be integrally formed with the pedestal.

When assembled together, the spars form a mast that is hollow, thereby minimizing its weight. Each spar preferably is made of plastic to further minimize its weight. Each spar preferably is made from an extrusion such that each spar is identical to each and every other spar, making both construction and assembly simple and economical.

In assembly, two spars are cut from an extrusion. One of the spars is rotated 180° relative to the other one of the spars so each one of the tongues will properly line up with its corresponding groove. One spar is urged against the other spar until each tongue seats in its respective groove, positioning the flaps of each piece of outer covering between the spars. In another preferred assembly method, an end of each tongue is inserted into an end of its respective groove. Thereafter, one spar is moved relative to the other spar until the ends of both spars are flush with each other. If desired, a clamping force can be applied by the spars against the flaps disposed between them to help hold them in place.

Objects, features and advantages include at least one of the following: providing a cat-scratching post that can stand uprightly and which has a covering held without externally exposed fasteners; providing a cat-scratching post equipped with a covering that need not be attached in the vicinity of those portions of the covering that are exposed and therefore available for engagement by a cat; providing a cat-scratching post whose covering can be replaced when worn; providing a cat-scratching post whose outer covering can be cheaply and easily replaced, such as with used carpeting, another type of fabric, or the like; providing a cat-scratching post that has its covering anchored in a manner that repeated scratching or pulling by a cat or other animal will not pull out the outer covering, the ends thereof, or end up exposing any fasteners thereof; providing a cat-scratching post that is of self-locking construction; providing a cat-scratching post that resists tipping; providing a cat-scratching post of modular construction that is easy to disassemble to replace the covering; providing a cat scratching post having a hollow mast formed of lightweight plastic spars that saves weight, reduces shipping costs, and yet increases strength; providing a cat-scratching post of simple, quick, and inexpensive manufacture that is durable, long-lasting, and easy-to-use, and providing a method of making and assembling a cat-scratching post that is simple to implement, quick, labor-efficient, economical, and which requires relatively simple skills to perform.

Various features and advantages of the present invention will also be made apparent from the following detailed description and the drawings.

BRIEF DESCRIPTION OF THE DRAWINGS

Preferred exemplary embodiments of the invention are illustrated in the accompanying drawings in which like reference numerals represent like parts throughout and in which.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF AT LEAST ONE PREFERRED EMBODIMENT

Figure 1:
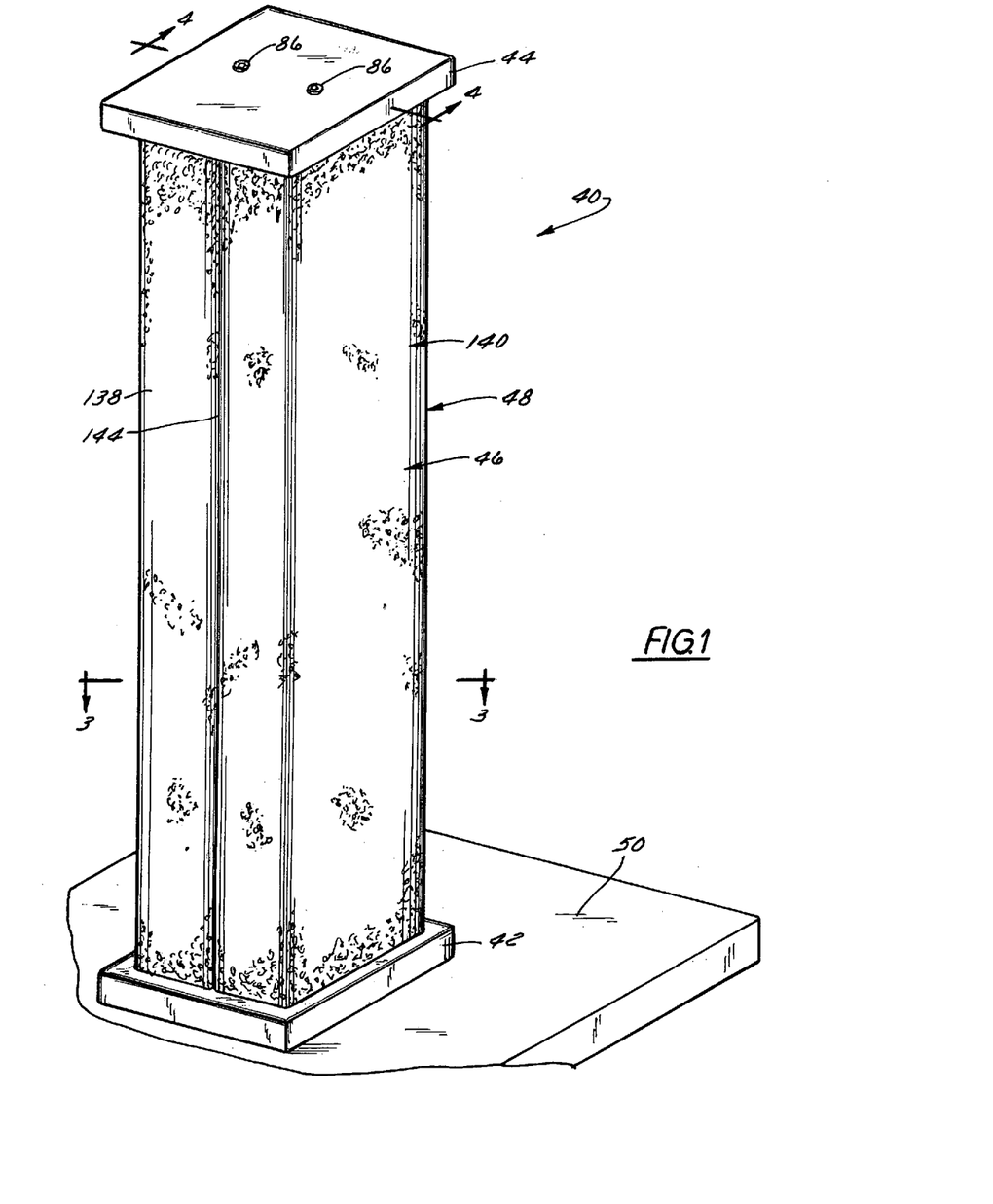
FIG. 1 is a perspective view of a cat scratching post constructed in accordance with a first preferred embodiment of the invention.

FIG. 1 illustrates a first preferred embodiment of a cat scratching post 40 that includes a lower end cap or base 42, an upper end cap or cap 44, and a vertical post assembly or mast 46 that extends vertically from the base 42 to the upper cap 44 to form a vertical portion 48. The base 42 is removably mounted on a pedestal 50 that can be set on a floor. FIG. 1 illustrates the cat scratching post 40 in an upright operating position where it is supported on its pedestal 50.

The pedestal 50 preferably is large enough to provide sufficient stability to the cat scratching post 40 such that it remains upright while the cat is scratching the cat scratching post 40. In a preferred embodiment, the pedestal 50 is, for example, sixteen inches wide, sixteen inches deep, and five-eighths of an inch high. Preferably, the pedestal 50 is made from particle board, press board, plastic, or the like. The upper, outer edges and corners of the pedestal 50 preferably are rounded to minimize or even prevent possible injury to a cat and an owner when coming into contact therewith. At or adjacent its center, the pedestal 50 preferably includes four through-bores 52, which are each alignable with corresponding holes 54 in the base 42 for mounting the pedestal 50 to the base 42 and the mast 46. Each of the through-bores 52 is preferably spaced from two of its outer edges of the pedestal 50 by about, for example, six inches. In a preferred embodiment, each through-bore 52 preferably includes a counterbore (not shown) to accommodate a head 56 of a screw 58 or other fastener when it is inserted into the through-bores 52. This recesses the fastener head 56 away from the floor so as not to contact and damage the floor.

Figure 2:
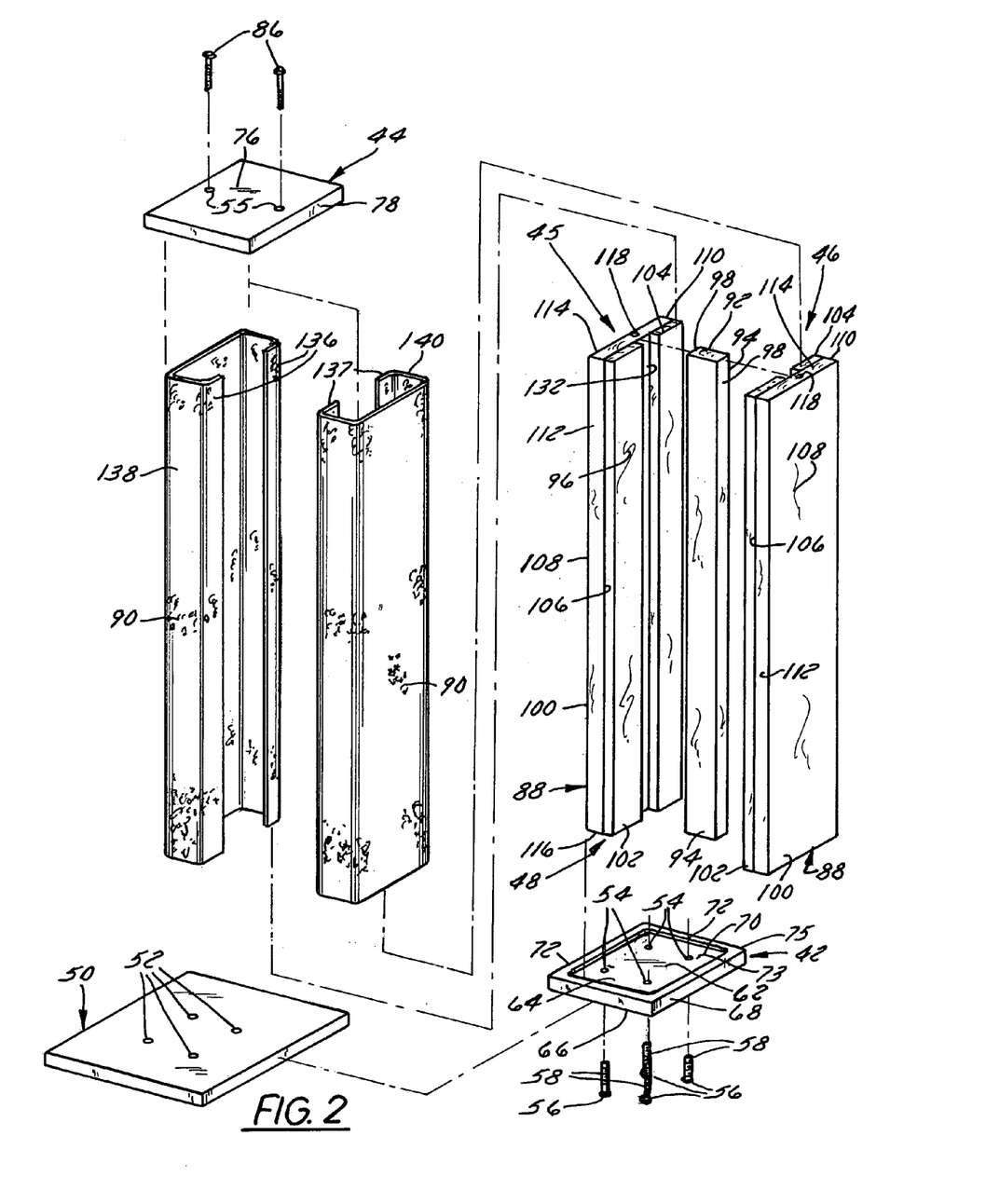
FIG. 2 is an exploded view of the cat scratching post of FIG. 1.

Referring additionally to FIG. 2, the base 42 and the upper cap 44 are preferably identical to one another, except that the base 42 can include four preformed holes 54, whereas the upper cap 44 can include two preformed holes 55. They may be formed from any desired solid material, including wood or an injection molded plastic. Each comprises a plate 62 having a shape that at least generally matches the shape of the mast 46 and that has a diameter or width that is slightly larger than that of the mast 46. Hence, in the illustrated embodiment in which the mast 46 is square when viewed in transverse cross-section, the base 42 and upper cap 44 are each square and have a width larger than that of the mast 46.

The base 42 includes an upper or proximal horizontal surface 64 designed to engage the mast 46, a distal or lower horizontal surface (not shown) designed to face away from the mast 46, and an external peripheral surface 68 leading vertically from the proximal surface 64 to the distal surface. The proximal horizontal surface 64 is recessed to form a receptacle or recess 70 defined by upraised sidewalls 72 located adjacent corresponding sidewalls of the mast 46 and a bottom 73 upon which the mast 46 rests. Surrounding the receptacle 70 is a lip 75 that bounds the periphery of the mast 46.

The base 42 is attached to the mast 46 by fasteners 58, preferably wood screws, passing through-holes 54 in the base 42 from the distal surface 66 and into the bottom end 48 of the mast 46. In addition, the base 42 can be glued to or otherwise additionally affixed to the mast 46.

Figure 4:
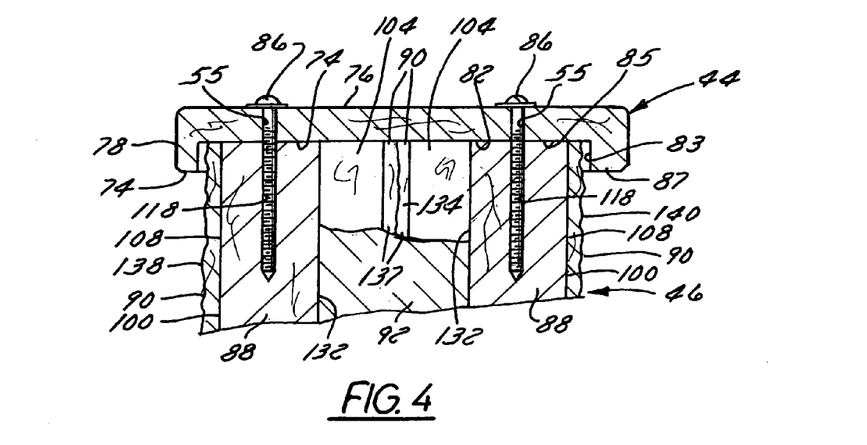
FIG. 4 is a sectional view through the top of the cat scratching post of FIG. 1 taken generally along the line 4—4 of FIG. 1.

As can best be seen in FIG. 4, the upper end cap 44 include a proximal or lower horizontal surface 74, a distal or upper horizontal surface 76, and an outer peripheral inner surface 78. The upper end 45 of the mast 46 is seated in a receptacle or recess 82 in the proximal horizontal surface 74 that is defined by upraised sidewalls 83 located adjacent sidewalls of the mast 46 and a bottom 85 upon which the mast 46 rests. Surrounding the receptacle 82 is a lip 87 that bounds the periphery of the mast 46. The upper cap 44 is attached to the mast 46 by fasteners 86, preferably wood screws, extending vertically downwardly through the holes 55 in the upper cap 44 and in the upper end of the mast 46. In addition, the upper cap 44 can be glued to or otherwise additionally affixed to the mast 46.

The mast 46 includes two vertical sections that are upstanding supports or spars 88, which are each covered by a cat scratching material 90 to present a scratching surface for the cat. Each support 88 comprises or is an elongated spar that includes an interior spar surface. The fasteners 86 also hold the supports 88 of the mast 46 in position relative to one another as detailed below. The mast 46 may be any desired shape when viewed in transverse cross-section, including, but not limited to, square, ovoid, circular, or rectangular. It is square in the illustrated first preferred embodiment, having a width, for example, of about twenty-six inches and a height of about thirty-one inches. Pursuant to an aspect of the invention, it is formed from two or more vertically extending supports 88 that cooperate to help retain a cat scratching material 90 in place in a manner that preferably requires no screws, tacks, or nails.

Figure 3:
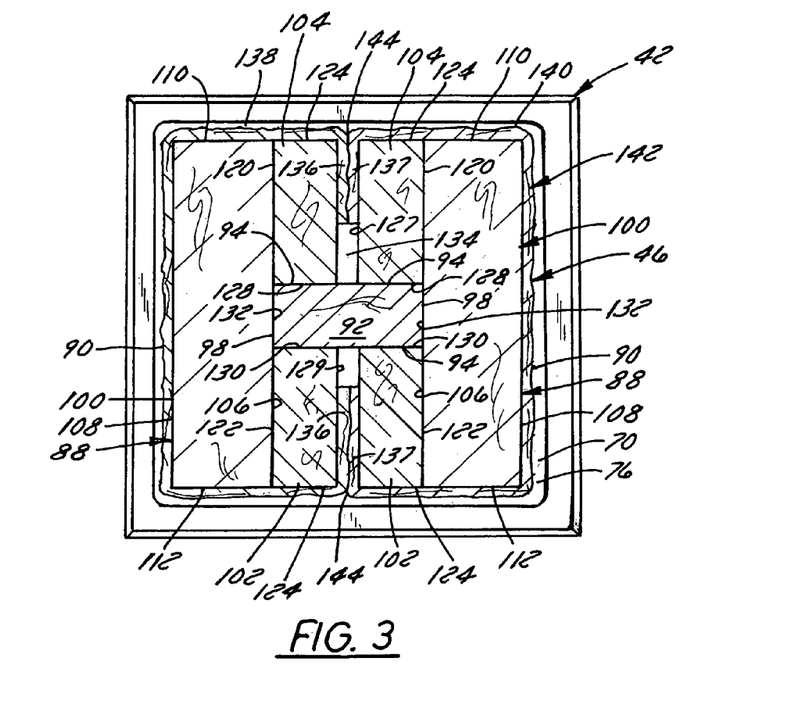
FIG. 3 is a sectional view through line 3—3 of FIG. 1.

Referring now to FIGS. 2–4, the mast 46 is formed from the two vertical supports 88 linked to one another by a cross-brace or spline 92 that also is of elongate construction. The connector spline 92 and the supports 88 preferably have generally the same length, although the connector spline 92 may be shorter than the supports 88. The illustrated connector spline 92 and supports 88 can be formed from wood, but other materials, including plastic, would also be suitable.

The connector spline 92 is rectangular in cross-section, having two opposed relatively long major surfaces 94 extending perpendicularly to corresponding major surfaces 96 of the supports 88 and two opposed narrower minor surfaces 98 extending in parallel with the major surfaces 96 of the supports 88.

Each support 88 includes an outer sidewall 100 and first and second inner beams 102 and 104. Each sidewall 100 has inner and outer major surfaces 106 and 108, opposed minor surfaces 110 and 112 extending perpendicularly between the major surfaces 106 and 108, and upper and lower ends 114 and 116. The upper end of each sidewall 100 has at least one hole 118 therein for receiving an associated wood screw 86, and each lower end has two holes (not shown) therein for receiving associated wood screws 86. The first and second inner beams 102 and 104 each have an outer major surface 120 and 122 affixed to the inner major surface 106 of the outer sidewall 100, and an outer minor surface 124 that is flush with the minor surface 110 and 112 of the corresponding outer sidewall 100, thereby forming a continuous minor surface of the finished support 88. The length of the first and second inner beams 102 and 104 are the same as the length of the sidewalls 100.

Inner minor surfaces 128 and 130 of the first and second inner beams 102 and 104 are spaced from one another by a distance at least equal to the length of the minor surface 98 of the connector spline 92 to form a slot or groove 132 in the interior support surface that receives one of the minor surfaces 98 of the connector spline 92. The slot 132 in one support 88 receives one side or tongue of the connector spline 92, and the slot 132 in the other support 88 receives the other side or tongue of the connector spline 92 to form the mast 46. The major surface 94 of the connector spline 92 is slightly longer or wider than the combination of the lengths of the minor surfaces 128 and 130 of the inner beams 102 and 104, providing a small gap 134 between the supports 88 for receiving and retaining a portion of the cat scratching material 90 therebetween.

The cat scratching material 90 is an outer covering that a cat claws during use. In one preferred embodiment, the covering 90 is formed by a plurality of pieces or sections 138 and 140 of cat scratching material 90. Each piece or section 138 and 140 defines a cover section that covers the exterior of an associated support 88 to form a post assembly 142. The cover sections 138 and 140 preferably are comprised of a fabric. In a preferred embodiment, the fabric is a woven fabric and even more preferably a fabric made from woven rope. In one preferred embodiment, the cover sections 138 and 140 are each made of carpet fabric. If desired, the cover sections 138 and 140 can also be made of some other material.

Referring now to FIG. 3, each cover section 138 and 140 is wrapped around the exterior of a corresponding support 88 to present flaps 136 and 137 that are retained between the supports 88 preferably adhesively. If desired, each flap 136 and 137 can be secured or further secured to its corresponding support 88 using one or more screws, tacks or nails (not shown). Where screws, tacks or nails are used, they each extend through one of the flaps 136 and/or 137 into the interior surface 96 of its corresponding support 88 so they are not exteriorly exposed when assembly is completed. To help further retain each cover section 138 and 140 in place, the assembled supports 88 can clamp or pinch the flaps 136 and 137 between them.

For each support 88, its associated cover section 138 and 140 is wrapped around its outer major surface 108 of the sidewall 100, around both of the outer minor surfaces 110 and 112 of its sidewall 100, around the outer minor surfaces 124 of both inner beams 102 and 104, and around at least part of the inner major surfaces 127 and 129 (FIG. 3) of both the inner beams 102 and 104. Hence, the entire exterior of each support 88 is covered by a corresponding cover section 138 and 140. Flaps 136 and 137, formed by the opposite ends or sides of each cover section 138 and 140, are both positioned between the opposed supports 88. When the scratching post 40 is fully assembled, preferably in the manner described below, at least the end flaps 136 and 137 are each retained between the opposed inner major surfaces 127 and 129 (FIG. 3) because the supports 88 are assembled so they remain so close to each other.

The end flaps 136 and 137 can be pinched or clamped between the opposed supports 88, as best seen in FIG. 3, to hold or help hold the cover sections 138 and 140 in place. Any clamping force provided may, if desired, be supplemented by fastening the end flaps 136 and 137 of each cover section 138 and 140 to the inner major surface 127 and 129 of the inner beam 102 and 104 of the corresponding support 88. While an adhesive is preferred, tacks, nails or staples can be used alone or in combination with an adhesive. Where tacks, nails or staples are used, they preferably are disposed only between the inner major surfaces 127 and 129 of the supports 88 such that they are not and cannot be exteriorly exposed when assembly is completed.

In one preferred assembly, each cover section 138 and 140 is adhesively bonded to the exterior of its respective support 88 along substantially all of the surface area of contact therebetween. For example, an adhesive can be disposed between each cover section 138 and 140 and the outer major surface 108 of its corresponding support 88, between each cover section 138 and 140 and the side edges 112 of its corresponding support 88, and/or between each cover section 138 and 140 and the corresponding interior surface 127 and 129 of its corresponding support 88. No fasteners are used to attach either cover section 138 and 140. The adhesive can be allowed to suitably cure before further assembly is performed.

To assemble the post 40, the cover sections 138 and 140 are wrapped around preassembled supports 88 such that the end flaps 136 of cover section 138 are each positioned along the interior surface of its corresponding support 88 and face corresponding end flaps 137 of the opposed cover section 140, which is positioned on its corresponding support 88 in a like manner. One or both end flaps 136 and 137 preferably is at least tacked or glued in place. Then, the connector spline 92 is inserted into slots 132, and the supports 88 are urged towards one another preferably until the opposed end flaps 136 and 137 abut one another. Depending on the nature of the fit between the connector spline 92 and each support 88 and how tightly the supports 88 are urged toward each other, the connector spline 92 can help ensure the supports 88 are positioned such that the end flaps 136 and 137 are pinched or clamped between the facing internal surfaces 127 and 129 (FIG. 3) of the supports 88.

To attach the upper cap 44, fasteners 86, preferably wood screws, are inserted through-holes 55 in the upper cap 44 until they each threadably engage the top end of one of the supports 88. The fasteners 86 preferably are arranged such that at least one fastener 86 engages one of the supports 88 and at least one other fasteners 86 engages the other one of the supports 88. The top end of each support 88 can include one or more preformed bores 118 to help facilitate receipt of the threaded portion of each fastener 86 it receives.

To attach the lower end cap or base 42, fasteners 58, preferably wood screws, are inserted in a like manner through the through-bores 52 in the pedestal 50 and through the through-holes 54 in the base 42. The end of at least one fastener 58 engages the bottom end of each one the supports 88. The top end of each support 88 can include one or more preformed bores (not shown) to help facilitate receipt of the threaded portion of each fastener 58 it receives.

When this is done, the supports 88 are now securely held in place with the flaps 136 and 137 disposed between them. Referring back to FIG. 1, the cover sections 138 and 140 form a seam 144 where the flaps 136 and 137 of the two sections 138 and 140 converge and preferably abut. As a result, the side edge of each flap 136 and 137 is located inside the assembled mast 46. As a result, a cat scratching the post 40 cannot engage and pull away either cover section 138 and 140 at or adjacent any edge of any flap 136 and 137. The end flaps 136 and 137 preferably are not disposed between the connector spline 92 and either slot 132 of either support 88.

The cover sections 138 and 140 are thus attached to the supports 88 without the use of any externally accessible tacks, staples, or other fasteners that are exteriorly exposed. Thus, the cat scratching post 40 is much safer for cats when compared to previous cat scratching posts that used such fasteners because there are no dangerous tacks, staples, or other fasteners that might injure a cat. In addition, the absence of such exposed fasteners, a cat using the post 40 is not able to unwrap the fabric from the mast 46, as with previous cat scratching posts.

Figure 5:
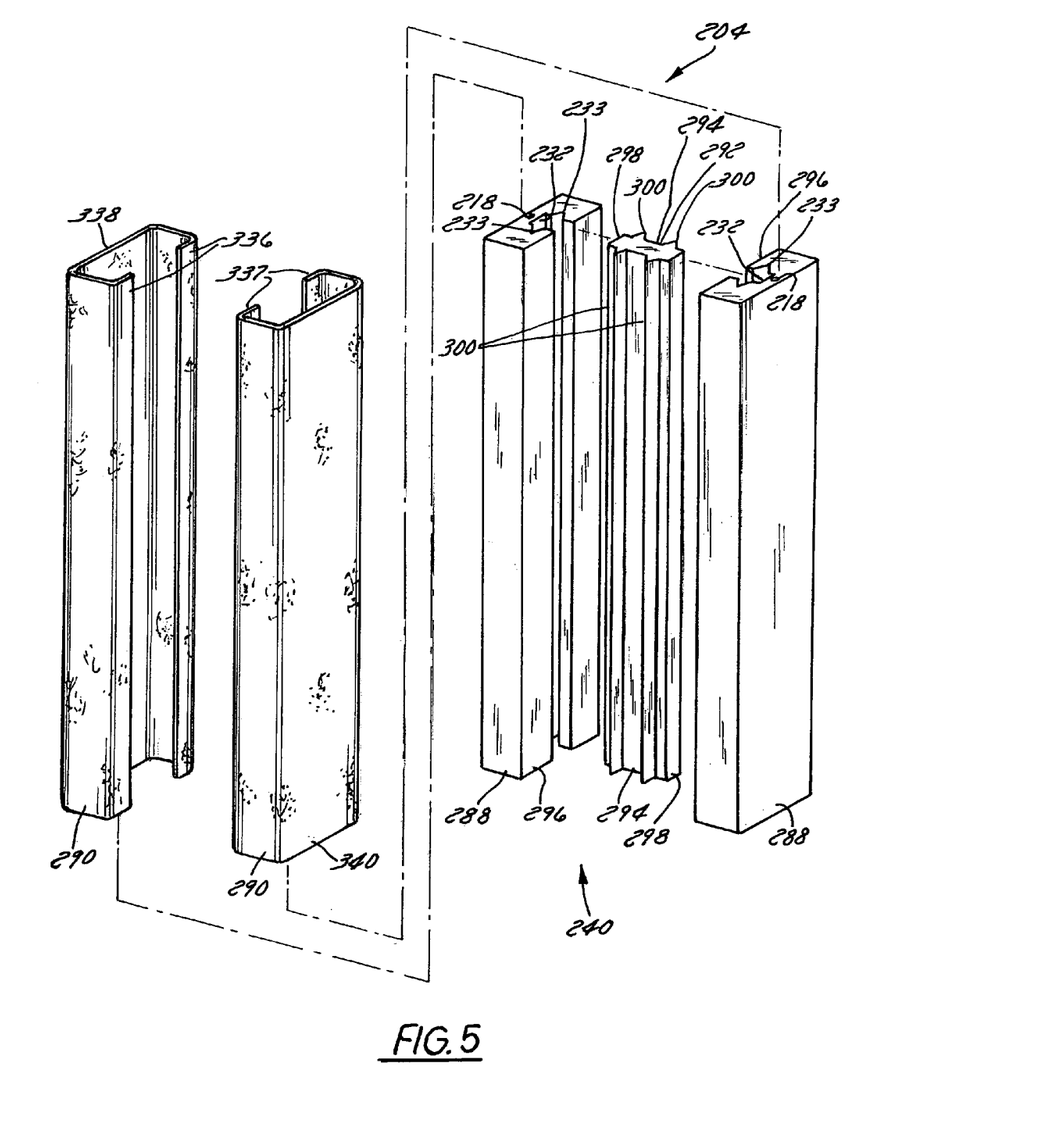
FIG. 5 is an exploded view of a cat scratching post constructed in accordance with a second preferred embodiment of the invention.
Figure 6:
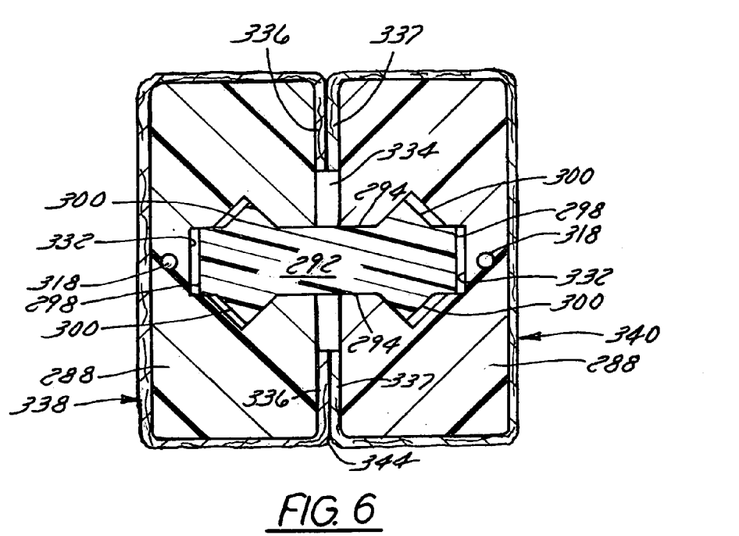
FIG. 6 is a sectional view of FIG. 5.

FIGS. 5 and 6 illustrate a second preferred embodiment of a cat scratching post 240 that produces a cat scratching post that appears from the outside to be substantially identical to the cat scratching post 40 of the first preferred embodiment, except in the following respects. Elements of the cat scratching post 240 of FIGS. 5 and 6 corresponding to elements of the cat scratching post 40 of FIGS. 1–4 are, accordingly, designated by the same reference numerals, incremented by 200.

First, in the cat scratching post 240, the supports or spars 288 are formed integrally, as opposed to being formed from separate components. For example, each support 288 preferably is of one-piece, integral and homogeneous construction. While each support 288 can be made from wood, it preferably also can be made of plastic. In one preferred method of making each support 288, each support 288 is extruded of plastic.

In addition, the connector spline 292 and the supports 288 are shaped differently than the corresponding connector spline 92 and supports 88 of the first preferred embodiment of the cat scratching post 40. Specifically, the connector spline 292 has a generally rectangular cross-section with two longitudinally extending major surfaces 294 extending perpendicularly to corresponding major surfaces 296 of the supports 288 and two opposed narrower minor surfaces 298 extending parallel with the major surface 296 of a corresponding side support 288. Two pairs of spaced apart ribs 300, each of generally triangular cross-section, project outwardly on either side of the major surfaces 294 of the spline 292. The ribs 300 each extend longitudinally substantially the length of the connector spline 292. The supports 288 each have a slot or groove 232 formed in an interior support surface 296 that is complementary to and receives one side edge of the connector spline 292, including its corresponding minor surface 298 and one pair of the opposed ribs 300. As is also shown in FIG. 5, each groove 232 has a pair of oppositely extending grooves 233, each of which is complementarily contoured so as to accept one of the ribs 300 of the connector spline 292.

In this preferred embodiment, the cat scratching post spars or side supports 288 are made of a non-wood material that preferably is a synthetic material, preferably plastic. In a preferred method of making such, each support 288 is comprised of extruded material that is lighter in weight than wood. Preferably, each support 288 is made of an extruded plastic such that the resultant post is lightweight, yet strong, and inexpensive to ship. Preferably, each connector spline 292 is also constructed thusly.

The connector spline 292 and supports 288 engage in the manner depicted in FIGS. 5 and 6 such that the connector spline 292 interconnects the supports 288 and helps keep them positioned close to each other. The supports 288 preferably are disposed close to each other such that the flaps 336 and 337 of the cover sections 338 and 340 are disposed between the supports 288. Preferably, the flaps 336 and 337 abut each other when the supports 288 are interconnected by the connector spline 292.

Although not shown in FIGS. 5 and 6, the assembly preferably includes at least one end cap that each correspond to one of the end caps 42 and 44 shown in FIG. 1. Where one or more end caps are used, each end cap further helps keep the assembly together using fasteners, such as in the manner disclosed above with regard to the embodiment of the cat scratching post 40 shown in FIGS. 2–4. Where fasteners are used, they preferably are only used to attach each end cap to the connector spline 292 and/or to one or more of the supports 288. The assembly preferably also includes a pedestal that corresponds to pedestal 50 shown in FIG. 1.

In assembly, the connector spline 292 is keyed to register with complementary recesses 332 in each support 288 such that it can be assembled together with portions of the outer covering 290 disposed therebetween. In a preferred method, each connector spline 292 functions like a key in that it is slid into a corresponding recess or keyway 332 in one of the supports 288 with part of the outer covering 290 disposed therebetween. When finished, the connector spline 292 can help ensure that the outer covering 290 becomes disposed between the supports 288 using a minimum of fasteners. If desired, it can be clamped between the supports 288. Preferably, no fasteners are needed or used to hold either cover section 338 and 340 of the outer covering 290 in place. Where any fastener is used to attach either cover section 338 and 340, the fastener is not externally exposed.

In assembly, a pair of flaps of at least one cover section 338 and/or 340 is disposed between the supports 288 when the supports 288 are held together by the connector spline 292. As is shown more clearly in FIG. 6, where the outer covering 290 is formed by a pair of cover sections 338 and 340, each flap 336 of cover section 338 overlaps a corresponding flap 337 of cover section 340 when the flaps 336 and 337 are disposed between the supports 288. Where clamping pressure is also applied by the supports 288 against the overlapped flaps 336 and 337, it helps to keep each cover section 338 and 340 wrapped around its respective support 288 in a manner that repeatedly withstands repeated clawing by a cat. As previously disclosed above with regard to the cat scratching post embodiment shown in FIGS. 2–4, an adhesive preferably is disposed between each cover section 338 and 340 and each one of the supports 288 to help immovably fix the outer covering 290 to the supports 288.

Figure 7:
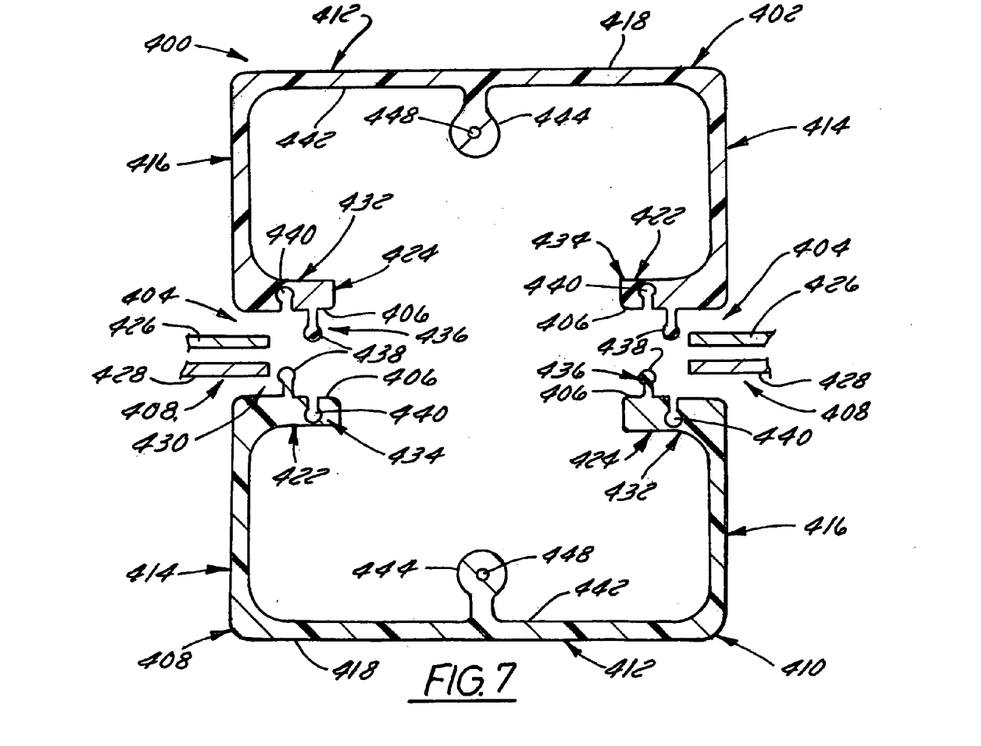
FIG. 7 is a sectional view of a third preferred cat scratching post embodiment.

FIG. 7 illustrates a third preferred embodiment of a cat scratching post assembly 400 that does not use any connector spline. In this preferred embodiment, each spar or support 402 forms part of an integral joint 404 that keeps the supports 402 together when the supports 402 are brought into engagement with one another during assembly. The supports 402 are constructed and arranged to keep their interior surfaces 406 adjacent and opposed to one another when the supports 402 are assembled together, ensuring that the side edges of a flexible cat scratching material 408 disposed therebetween are not externally accessible.

When assembled together, the supports 402 form a cat scratching post frame or mast 410 that is of tubular and hollow construction. By being of hollow construction, the mast 410 is advantageously lightweight, strong, long-lasting, and durable, producing a cat scratching post also having these same characteristics. Each support 402 preferably is formed of a plastic that further helps minimize weight. This produces a cat scratching post that is lightweight, strong, durable, easy to move, cheap to ship, and stable.

Each support 402 has an end wall 412 and a pair of sidewalls 414 and 416 that each has an outer surface 418 covered by scratching material 408 (only a portion of which is shown in FIG. 7). While other contours are possible, each end wall 412 and each one of the sidewalls 414 and 416 are flat or generally planar such that the assembled supports 402 form a mast 410 of substantially rectangular cross-section. Each support 402 also has an inner cat scratching material mounting surface 406 formed on each one of a pair of arms 422 and 424 that each extend inwardly from one of the support sidewalls 414 and 416. Each arm 422 and 424 preferably is formed by an inturned flange.

Each arm 422 and 424 of one support 402 preferably includes a portion that engages a corresponding portion of a respective one of the arms 424 and 422 of the other supports 402 to keep the supports 402 together upon assembly. These engaging portions each define a joint 404 that enables the supports 402 to be assembled together and helps keep them assembled together. In the preferred embodiment shown in FIG. 7, one of the joints 404 is located adjacent one side of the mast 410 and the other one of the joints 404 is located adjacent the other side of the mast 410.

Although not clearly shown in FIG. 7, at least one of the joints 404 is spaced inboard of an adjacent set of support sidewalls 414 and 416 to permit a portion of the cat scratching material 408 to be received between the mounting surfaces 406 of an opposed pair of arms 422 and 424 of an assembled mast 410. Where a single piece of cat scratching material 408 is used, one of the joints 404 is spaced inboard in this manner. Where two pieces of cat scratching material is used, both joints 404 are preferably spaced inboard.

Where a single piece of cat scratching material 408 is used, its retained portion preferably includes at least one side edge of the material. Each side edge of the cat scratching material 408 defines a flap 426 and 428. In a preferred embodiment, both of its flaps 426 and 428 are retained between the mounting surfaces 406 of one opposed pair of arms 422 and 424. Preferably, the flaps 426 and 428 overlap one another when disposed between the mounting surfaces 406.

Where two pieces of cat scratching material 408 are used, such as is depicted in FIG. 7, one piece wraps around the outside of one of the supports 402 and the other piece wraps around the outside of the other one of the supports 402. Where two pieces are used, the flap 426 of one piece preferably overlaps the flap 428 of the other piece and is received between the mounting surfaces 406 of one pair of opposed arms 422 and 424. Likewise, the other flap 428 of that piece overlaps the flap 426 of the other piece and is received between the mounting surfaces 406 of the other pair of opposed arms 422 and 424.

Each joint 404 preferably is formed by a tongue 430 that extends outwardly from the mounting surface 406 of one of the arms 422 of one support 402 and that is received in a complementary groove 432 formed in the mounting surface 406 of an opposed arm 424 of the other support 402. Each joint 404 can also include a groove 434 formed in the mounting surface 406 of the one of the arms 422 of the one support 402 that receives a tongue 436 that extends outwardly from the mounting surface 406 of the opposed arm 424 of the other support 402.

Each joint 404 preferably is of snap-fit construction so as to positively retain each tongue 430 and/or 436 in its respective groove 432 and/or 434 to keep both supports 402 together upon assembly. Each tongue 430 and 436 has an end that is a snap 438 and each groove 432 and 434 comprises a receiver that preferably is a snap receptacle 440. As is shown in FIG. 7, each snap 438 includes a narrow stem that extends outwardly and terminates in an enlarged head that preferably is rounded to facilitate insertion into a snap receptacle 440. Each snap receptacle 440 preferably includes a necked down entranceway channel that leads an enlarged retainer chamber that is configured to receive the head of one of the snaps 438.

To enable an end cap, such as end cap 42 or 44, or a pedestal, such as pedestal 50, to be attached to an assembled mast 410, each support end wall 412 has an interior surface 442 from which a mount 444 inwardly projects. The end of the mount 444 preferably comprises a flat mounting surface (not shown) into which a fastener, such as fastener 58 or 86, is driven when attaching the end cap or pedestal to the mast 410. Each mounting surface preferably includes a fastener guide bore 448 to help facilitate assembly. Preferably, each support 402 has such a mount 444 disposed at each end so that an end cap can be attached to each end. If desired, a pedestal, such as pedestal 50, can be attached at one end of each support 402 and an end cap, such as end cap 44, can be attached at the other end of each support 402.

Each support 402 preferably is made from an extrusion (not shown) that is produced using a conventional plastic extrusion molding process known in the art such that the support cross-section shown in FIG. 7 extends the full length of the support 402. As a result, each one of the support 402 used to construct a mast 410 is identical in cross-section and along its length. Each one of the support 402 is also of one-piece, unitary and homogeneous construction.

This advantageously makes support manufacture economical because each support 402 is simply cut to the desired length from the extrusion. Two such supports 402 are then properly oriented before assembling them together to form the mast 410, with the cat scratching material 408 becoming disposed between the supports 402 during assembly.

In assembly, the supports 402 are oriented in the manner shown in FIG. 7. Thereafter, one support 402 is attached to the other support 402 by pressing the support 402 against the other support 402 until each joint 404 engages. Where each joint 404 is of tongue and groove construction, one support 402 is pressed against the other support 402 until each tongue 430 and/or 436 of each joint 404 is received in its respective groove 432 and 434. Where each tongue 430 is formed to include a snap 438, pressing the one support 402 against the other support 402 forces each snap 438 into its corresponding complementary snap receptacle 440.

In another preferred method of assembly, one support 402 can be manipulated relative to the other support 402 such that the tongue 430 and/or 436 of each support 402 is slidably telescopically received in a corresponding groove 432 and 434 of the other support 402. One or both support 402 are then moved in an axial direction until the ends of both supports 402 are flush with each other.

To facilitate assembly, each piece of cat scratching material 408 preferably is affixed to one of the supports 402. This preferably is done using an adhesive disposed between the cat scratching material and an outer surface of each support which it covers.

Figure 8:
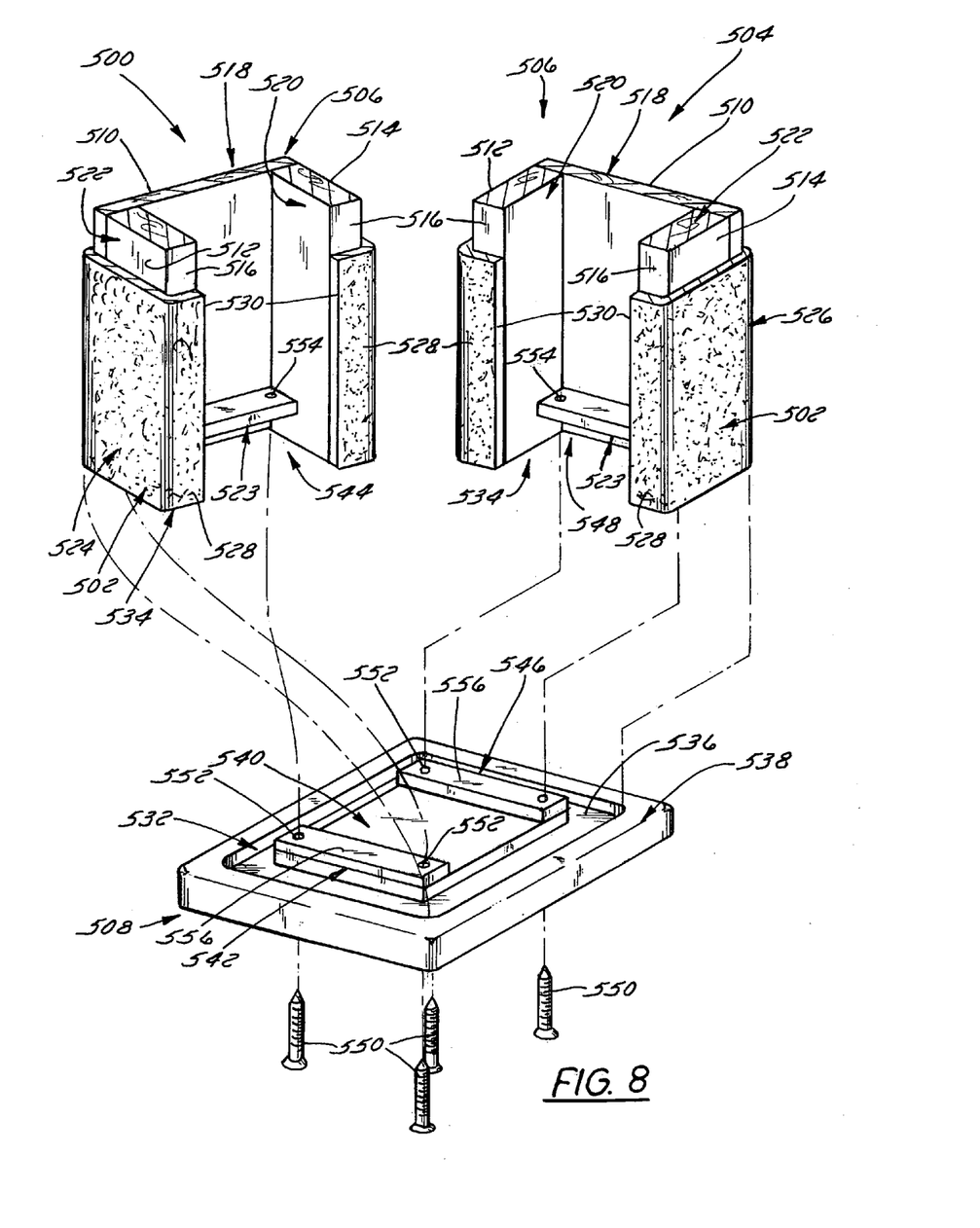
FIG. 8 is a fragmentary perspective exploded view of a fourth preferred cat scratching post embodiment.

FIG. 8 illustrates a currently preferred embodiment of a cat scratching post 500 made in accordance with the invention such that the cat scratching material 502 enshrouds a post assembly 504 without the use of any fastener that is exteriorly exposed. As a result, a cat clawing at the scratching material 502 cannot be injured by any such exposed fastener because no such exposed fastener is used. In addition, because no externally exposed fasteners are employed, a cat clawing at the cat scratching material 502 cannot pull out the fasteners and pull away the scratching material 502.

The post assembly 504 is an upright mast 504 that is formed by a pair of elongate spars or supports 506, each of which is disposed between a pair of end caps 508, only one of which is shown in FIG. 8. Each support 506 has an end wall 510, a pair of sidewalls 512 and 514, and an interior surface 516. The supports 506 are oriented with the interior surface 516 of one supports 506 disposed adjacent and generally parallel with the interior surface 516 of the other supports 506 forming a post assembly 504 of generally rectangular construction.

Each support 506 preferably has a generally U-shaped cross-section. In the preferred embodiment shown in FIG. 8, the end wall 510 is formed by a center board 518 of generally rectangular cross-section, and each sidewall 512 and 514 is formed respectively by a side board 520 and 522. The side boards 520 and 522 are attached to center board 518, such as with one or more fasteners (not shown) and/or with an adhesive (not shown). A cross-brace 523 preferably extends between the sidewalls 512 and 514 of each support 506 and is located adjacent each end of the support 506.

Cat scratching material 502 preferably is attached to the outer surface of each support 506. Preferably, scratching material 502 is attached to the support end wall 510, each sidewall 512 and 514, and at least a portion of the interior surface 516 that respectively extends along each sidewall 512 and 514. The scratching material 502 preferably is adhesively attached to the outer surface of the support end wall 510 and the outer surface of each sidewall 512 and 514. The scratching material 502 can also be adhesively attached to the support interior surface 516. If desired, fasteners (not shown) can also be used to attach the cat scratching material 502 to the interior surface 516 so long as each fastener is not externally exposed when the supports 506 are assembled to form a post assembly 504.

The cat scratching material 502 is made of two separate sections 524 and 5.26 of the material 502, each of which covers the exterior of a different one of the supports 506. Each section 524 and 526 has a pair of side flaps 528, each of which has a side edge 530. Each section 524, including its flaps 528, is attached to its respective support using an adhesive.

Each end cap 508 has a receptacle 532 in which one end 534 of each support 506 are received. Each receptacle 532 comprises a channel 536 that has a shape complementary to the ends 534 of the supports 506, so that each support end 534 stably seats in the channel 536 during assembly. The outer side wall of the channel 536 is defined by an outer lip 538 that extends outwardly from the outer periphery of the end cap 508. The lip 538 preferably is integrally formed of the cap 508.

The inner side wall of the channel 536 is defined by an upraised spline 540 that is inserted during assembly between the supports 506 such that it lies inside the end wall 510 and the sidewalls 512 and 514 of each support 506. One side of the spline 540 forms a first tongue 542 that is received in a first groove 544 defined between the sidewalls 512 and 514 of one support 506 and the other side of the spline 540 forms a second tongue 546 that is received in a second groove 548 defined between the sidewalls 512 and 514 of the other support 506. The spline 540 is generally rectangular or square and can be integrally formed as part of the cap 508. If desired, the spline 540 can be a separate component that is attached or affixed to the cap 508.

A plurality of fasteners 550 are used to attach the end cap 508 to each one of the supports 506. Each fastener 550 preferably extends through a preformed through-bore 552 in the end cap 508 and engages part of one of the supports 506. Preferably, the end cap 508 is attached to each support 506 by a plurality of fasteners 550. Each fastener 550 preferably is a wood screw that threads into part of one of the supports 506.

In the preferred embodiment shown in FIG. 8, each fastener 550 preferably engages the cross-brace 523 of one of the supports 506 with the cross-brace 523 overlying and disposed adjacent part of the spline 540. Preferably, each cross-brace 523 overlies one of the tongues 542 or 546 of the spline 540. If desired, each cross-brace 523 can have a preformed pilot bore 554 (only one of which is shown in FIG. 8) for each fastener 550 it is intended to receive.

In the preferred embodiment shown in FIG. 8, a spacer or shim 556 overlies each tongue 542 and 546 of the spline 540. Each spacer or shim 556 preferably bears against part of the cross-brace 523 of a corresponding one of the supports 506. It is contemplated that the spacer or shim 556 may not be needed in all instances. While each spacer or shim 556 can be a separate component that is attached or affixed to the spline 540, each spacer can also be integrally formed of the spline 540 and/or end cap 508.

In assembly, the end of the end wall 510 and the end of both sidewalls 512 and 514 of both supports 506 are received in part of the channel 536 of the end cap 508. Each tongue 542 and 546 of the spline 540 is respectively received in its corresponding groove 544 and 548 in an associated one of the supports 506. Thereafter, the fasteners 550 are used to attach the end cap 508 to the supports 506 by being threaded into a corresponding cross-brace 523 of each support 506.

If desired, a pedestal, such as pedestal 50 (FIG. 1), can be attached or affixed to the bottom end cap 508. If desired, the bottom end cap 508 can be integrally incorporated into the pedestal thereby obviating the need for a bottom end cap 508 that is separate from the pedestal. For example, the receptacle 532, its channel 536, the spline 540, and the like can all be incorporated into the pedestal.

The same procedure is followed where there is a top end cap (not shown). Although not shown, the top end cap preferably is constructed substantially the same as the bottom end cap 508. A plurality of fasteners, like fasteners 550, is also used to attach the end cap to each one of the supports 506.

When assembly is completed, a cat scratching post that looks the same as or substantially identical to the cat scratching post 40 shown in FIG. 1 results. When assembly is completed, the flaps 528 of both cover sections 524 and 526 overlie one another with each one of their side edges 530 being recessed within the supports 506 such that they cannot be scratched or otherwise engaged by a cat using the resultant cat scratching post. Preferably, the flaps 528 abut or bear against one another. Any fastener used to attach either cover section 524 and 526 to its associated support 506 is located only along the portion of the flap 528 that is disposed between the opposed interior surfaces 516 of the opposed supports 506. As a result, no such fastener is exteriorly exposed. Preferably, however, no such fastener is used to attach any portion of either cover section 524 and 526 to its corresponding support 506.

It is also to be understood that, although the foregoing description and drawings describe and illustrate in detail one or more preferred embodiments of the present invention, to those skilled in the art to which the present invention relates the present disclosure will suggest many modifications and constructions as well as widely differing embodiments and applications without thereby departing from the spirit and scope of the invention.

It is claimed:

1. A cat scratching post comprising a plurality of vertically extending elongate spars carried by a base around which is disposed an outer covering, wherein there is no exteriorly exposed fastener used to attach the outer covering to any one of the spars, wherein the outer covering comprises a pair of end flaps each of which is disposed along a side edge of the outer covering, and wherein each one of the flaps is disposed between the spars and not exteriorly exposed.

2. The cat scratching post of claim 1 further comprising an end cap disposed at one end of the spars that engages the spars to keep them disposed adjacent one another.

3. The cat scratching post of claim 2 wherein there are a pair of end caps with one of the end caps disposed at one end of the spars and the other one of the end caps disposed at the other end of the spars.

4. A cat scratching post comprising (a) a plurality of elongate spars having a generally U-shaped cross-section with an elongate surface of one of the plurality of spars opposing and adjoining an elongate surface of another one of the plurality of spars, (b) a flexible outer covering carried by at least one of the spars that includes a flap disposed between the opposing spar surfaces with no exteriorly exposed fastener engaging the flexible outer covering, and (c) a pedestal upon which at least one of the spars is uprightly seated.

5. A cat scratching post comprising a plurality of vertically extending elongate spars carried by a base around which is disposed an outer covering comprised of a woven material, wherein there is no exteriorly exposed fastener used to attach the outer covering to any one of the spars, wherein the outer covering comprises a plurality of cover sections that each have a pair of end flaps each of which is disposed along a side edge of the cover section, wherein there is a cover section is wrapped around the outside of each one of the spars with the flaps of each cover section tucked between the spars such that the side edge of each flap is not exteriorly exposed, and wherein the spars adjoin one another with at least one of the end flaps of at least one of the plurality of cover sections disposed therebetween where the spars adjoin one another.

6. The cat scratching post of claim 5 wherein no fastener is used to attach each one of the plurality of cover sections to its corresponding spar.

7. The cat scratching post of claim 5 further comprising a spline that interconnects each one of the plurality of spars.

8. The cat scratching post of claim 7 wherein the spline comprises a plurality of tongues and each spar comprises a groove wherein each one of the tongues of the spline is received in one of the grooves in one of the spars.

9. The cat scratching post of claim 7 further comprising an end cap that engages the spars at one end of the spars wherein the spline is carried by the end cap.

10. The cat scratching post of claim 9 wherein the spline is integrally formed of the end cap.

11. A cat scratching post comprising a plurality of vertically extending elongate spars each having a generally U-shaped cross-section around which is disposed a fabric or cloth flexible outer covering, wherein there is no exteriorly exposed fastener used to attach the outer covering to any one of the spars, wherein the outer covering comprises a plurality of cover sections that each have a pair of end flaps each of which is disposed along a side edge of the cover section, wherein there is a cover section is wrapped around the outside of each one of the spars with the flaps of each cover section tucked between the spars such that the side edge of each flap is not exteriorly exposed, and an end cap that comprises a pedestal upon which the spars are uprightly supported, and wherein the spars adjoin one another with the end flaps of the plurality of cover sections disposed between the spars where the spars adjoin one another.

12. A cat scratching post comprising a plurality of elongate spars carried by a base around which is disposed an outer cat scratchable covering, wherein there is no exteriorly exposed fastener used to attach the outer cat scratchable covering to any one of the spars, wherein the outer cat scratchable covering comprises a pair of end flaps each of which is disposed along a side edge of the outer cat scratchable covering, and wherein one of plurality of the spars snaps onto another one of the plurality of the spars disposing the flaps between the spars such that they are not exteriorly exposed.

13. A cat scratching post comprising a plurality of vertically extending elongate spars around which is disposed an outer covering, wherein there is no exteriorly exposed fastener used to attach the outer covering to any one of the spars, and further comprising a spline disposed between the spars that engages each spar and keeps the spars in a spaced apart relationship such that a portion of the outer covering is disposed between the spars with the spars being disposed in abutment.

14. The cat scratching post of claim 13 wherein the spline has a pair of tongues extending oppositely outwardly therefrom with one of the tongues received in a groove formed in one of the spars and the other one of the tongues received in a groove formed in the other one of the spars.

15. The cat scratching post of claim 14 wherein the spline further comprises a plurality of outwardly projecting ribs with one of the ribs extending from one tongue at an angle relative to the one tongue and the other one of the ribs extending from the other tongue at an angle relative to the other tongue with each groove in each spar including a recess complementarily contoured to accept a corresponding one of the ribs.

16. The cat scratching post of claim 15 wherein each rib is generally perpendicular to the tongue from which it extends.

17. The cat scratching post of claim 15 wherein each rib is of generally triangular cross-section.

18. The cat scratching post of claim 14 wherein the spline further comprises a plurality of pairs of outwardly projecting ribs with one pair of the ribs extending from one tongue at an angle relative to the one tongue and the other pair of the ribs extending from the other tongue at an angle relative to the other tongue with each groove in each spar including a plurality of recesses each complementarily contoured to accept a corresponding rib of one of the pairs of ribs.

19. The cat scratching post of claim 18 wherein each rib of each pair of ribs is generally perpendicular to the tongue from which it extends with one rib of each pair of ribs extending in one direction and the other rib of each pair of ribs extending in an opposite direction.

20. A cat scratching post comprising a plurality of vertically extending elongate spars around which is disposed an outer flexible cat scratchable covering, wherein there is no exteriorly exposed fastener used to attach the outer flexible cat scratchable covering to any one of the spars wherein one of the spars engages the other one of the spars at an integral joint disposed between the spars that keep the spars attached to each other.

21. The cat scratching post of claim 20 wherein the integral joint comprises a tongue integrally formed of one of the spars that are received in a groove formed in the other one of the spars.

22. The cat scratching post of claim 21 wherein the integral joint comprises a snap and the groove comprises a snap receiver wherein there is a snap fit provided therebetween.

23. The cat scratching post of claim 20 wherein the spars are attached to each other by a plurality of integral joints with one of the integral joints spaced from the other one of the integral joints.

24. The cat scratching post of claim 23 wherein each integral joint comprises a tongue integrally formed of one of the spars that are received in a groove formed in the other one of the spars.

25. The cat scratching post of claim 24 wherein each integral joint comprises a first tongue integrally formed of one of the spars that is received in a first groove formed in the other one of the spars and a second tongue formed in the other one of the spars that is received in a second groove formed in the one of the spars.

26. The cat scratching post of claim 23 wherein the outer covering comprises a first covering section that is wrapped around one of the spars and clamped between the spars and a second covering section that is wrapped around the other one of the spars and clamped between the spars.

27. The cat scratching post of claim 22 wherein the spars are substantially identical to each other.

28. The cat scratching post of claim 22 wherein each one of the plurality of spars is formed from an extrusion comprised of plastic.

29. The cat scratching post of claim 22 wherein the plurality of spars engages each other to form a hollow frame.

30. The cat scratching post of claim 29 wherein each one of the plurality of spars is identical to every other one of the plurality of spars.

31. The cat scratching post of claim 30 wherein each one of the plurality of spars is formed from an extrusion comprised of plastic.

32. A cat scratching post comprising a plurality of vertically extending elongate spars carried by a base around which is disposed an outer covering, wherein there is no exteriorly exposed fastener used to attach the outer covering to any one of the spars wherein each spar comprises an elongate board having a planar outer surface and interior surface, wherein the outer covering comprises a plurality of covering sections that each have a pair of side flaps with one of the side flaps disposed along one side of the covering section and the other one of the side flaps disposed along the other side of the covering section, wherein one of the covering sections is disposed along the planar outer surface of one of the spars with each flap of the one of the covering sections disposed along the interior surface of the one of the spars, wherein the other one of the covering sections is disposed along the planar outer surface of the other one of the spars with each flap of the other one of the covering sections disposed along the interior surface of the other one of the spars, and wherein each one of the flaps of the one of the covering sections overlie a corresponding one of the flaps of the other one of the covering sections and the overlapped flaps are disposed between the spars.

33. The cat scratching post of claim 32 wherein the interior surface of each spar has a longitudinally extending channel therein and further comprising a spline received in both grooves that interconnects the spars and fixes them in spaced apart relationship such that the interior surface of the one spar is disposed toward and adjacent to the interior surface of the other one of the spars with the flaps of both covering sections clamped therebetween.

34. The cat scratching post of claim 33 wherein each channel is defined by a sidewall having a groove therein and the spline comprises a plurality of ribs with one of the ribs disposed in the groove in the sidewall in one of the channels of one of the spars and the other one of the ribs disposed in the groove in the sidewall in the other one of the channels of the other one of the spars.

35. The cat scratching post of claim 33 wherein each channel is defined by a pair of sidewalls and an end wall with each sidewall having a groove therein and the spline comprises a first plurality of oppositely extending ribs adjacent one side edge and a second plurality of oppositely extending ribs adjacent its other side edge with one of the ribs of the first plurality of oppositely extending ribs received in one of the grooves in one of the channel sidewalls and the other one of the ribs of the first plurality of oppositely extending ribs received in one of the grooves in the other one of the channel sidewalls, and one of the ribs of the second plurality of oppositely extending ribs received in one of the grooves in one of the channel sidewalls and the other one of the ribs of the second plurality of oppositely extending ribs received in one of the grooves in the other one of the channel sidewalls.

36. A cat scratching post comprising a plurality of vertically extending elongate spars around which is disposed an outer covering, wherein there is no exteriorly exposed fastener used to attach the outer covering to any one of the spars wherein each spar comprises an elongate board having a planar outer surface and interior surface, wherein the outer covering comprises a plurality of covering sections that each have a pair of side flaps with one of the side flaps disposed along one side of the covering section and the other one of the side flaps disposed along the other side of the covering section, wherein one of the covering sections is disposed along the planar outer surface of one of the spars with each flap of the one of the covering sections disposed along the interior surface of the one of the spars, wherein the other one of the covering sections is disposed along the planar outer surface of the other one of the spars with each flap of the other one of the covering sections disposed along the interior surface of the other one of the spars, and wherein each one of the flaps of the one of the covering sections overlie a corresponding one of the flaps of the other one of the covering sections and the overlapped flaps are disposed between the spars, and wherein the interior surface of one of the spars comprises a tongue and the interior surface of the other one of the spars comprises a groove with the tongue of the one of the spars received in the groove in the other one of the spars receiving the flaps of side flaps of the covering sections between the interior surfaces of the spars.

37. The cat scratching post of claim 36 wherein the tongue comprises a snap and the groove comprises a snap receiver and wherein there is a snap fit between the snap and snap receiver when the snap is received in the snap receiver attaching one of the spars to the other one of the spars.

38. The cat scratching post of claim 36 wherein the spars engage each other along opposed inner surfaces that form a joint therebetween receiving a portion of the outer covering between the spar inner surfaces.

39. The cat scratching post of claim 38 wherein the engaged spars form a tubular frame that carries the outer covering.

40. A cat scratching post comprising:
a plurality of vertically extending elongate spars that each have a generally U-shaped cross-section with each one of the spars having an interiorly disposed surface that is opposed to the interiorly disposed surface of the other one of the spars;
an outer covering having a plurality of side flaps that are each disposed between the opposed interiorly disposed surfaces of the spars; and
a joint disposed between the spars that interconnects the spars.

41. The cat scratching post of claim 40 wherein the joint is formed by a portion of one of the spars that engages a portion of the other one of the spars.

42. A cat scratching post comprising:
a plurality of vertically extending elongate spars that each have a generally U-shaped cross-section with each one of the spars having a pair of spaced apart sidewalls, each of which comprises an inturned flange that includes an interiorly disposed surface, the spars disposed with the interiorly disposed surface of each one of the flanges of one of the spars opposing the interiorly disposed surface of each one of the flanges of the other one of the spars defining a first pair of opposed interiorly disposed surfaces and a second pair of opposed interiorly disposed surfaces;
an outer covering having a plurality of covering sections that each include a pair of side flaps with one of the side flaps of each one of the covering sections disposed between one of the pairs of opposed interiorly disposed surfaces and the other one of the side flaps of each one of the covering sections disposed between the other one of the pairs of opposed interiorly disposed surfaces; and a plurality of joints disposed between the spars that interconnect the spars with one of the joints disposed between one of the pairs of opposed interiorly disposed surfaces and the other one of the joints disposed between the other one of the pairs of opposed interiorly disposed surfaces.

43. A cat scratching post comprising:

an outer covering comprised of fabric; and a plurality of vertically extending elongate and plastic spars of identical construction that snap together to clamp a portion of the outer covering between the spars with the remainder of the outer covering disposed around the exterior of at least one of the spars.

44. A cat scratching post comprising:

an outer covering comprised of fabric;

a plurality of vertically extending elongate and plastic spars of identical construction that snap together to clamp a portion of the outer covering between the spars with the remainder of the outer covering disposed around the exterior of at least one of the spars; and wherein the spars are of snap together construction so as to comprise a frame of hollow and tubular construction and the outer covering is comprised of a plurality of sections of fabric that have a flap at each end that is clamped between the spars.

\* \* \* \* \*

UNITED STATES PATENT AND TRADEMARK OFFICE
CERTIFICATE OF CORRECTION

PATENT NO. : 7,171,922 B2 Page 1 of 1
APPLICATION NO. : 10/856041
DATED : February 6, 2007
INVENTOR(S) : John M. Lipscomb et al.

It is certified that error appears in the above-identified patent and that said Letters Patent is hereby corrected as shown below:

IN THE CLAIMS

CLAIM 27, column 17, line 3, delete "22" and substitute therefore -- 20 --;

CLAIM 28, column 17, line 5, delete "22" and substitute therefore -- 20 --;

CLAIM 29, column 17, line 8, delete "22" and substitute therefore -- 20 --;

Signed and Sealed this

Twenty-fourth Day of March, 2009

JOHN DOLL
*Acting Director of the United States Patent and Trademark Office*